Patented Mar. 2, 1926.

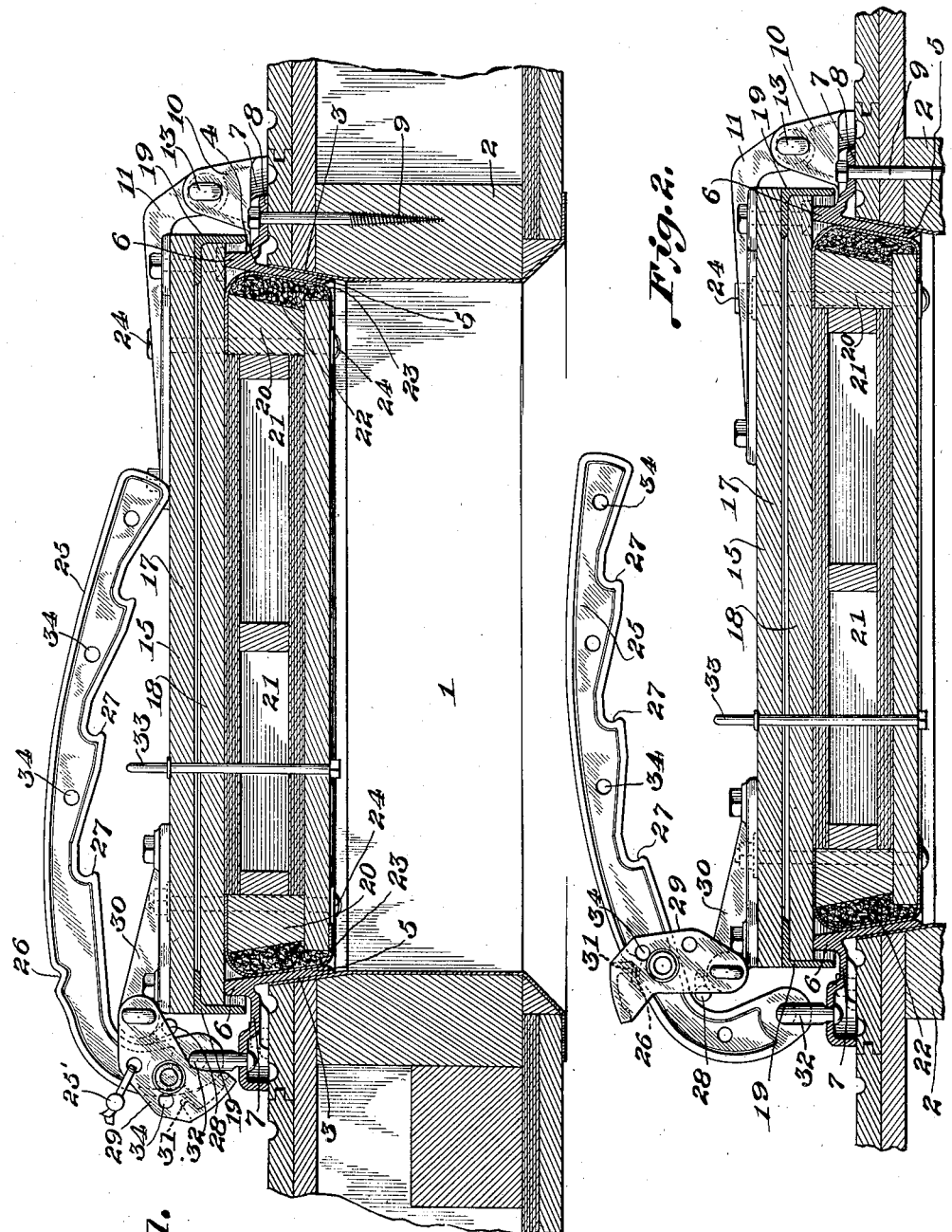

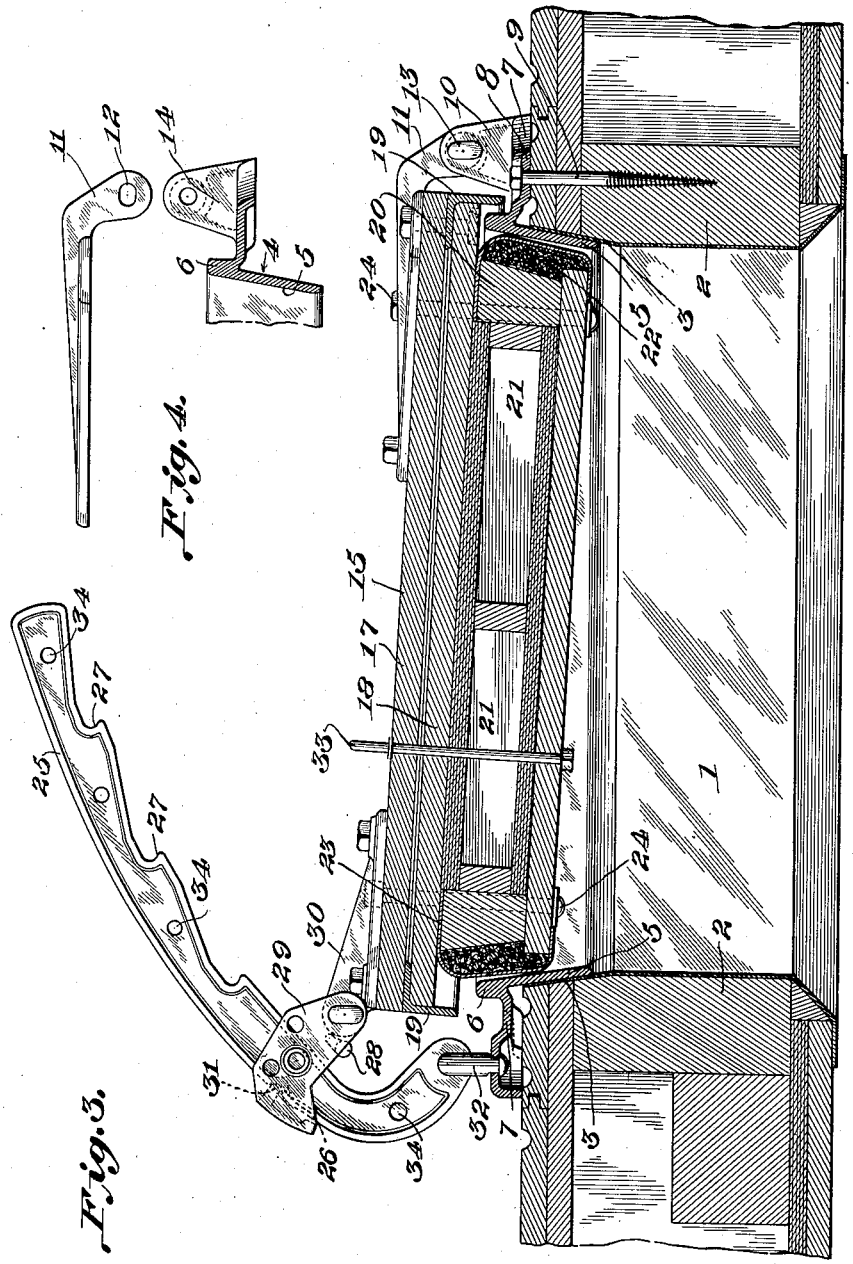

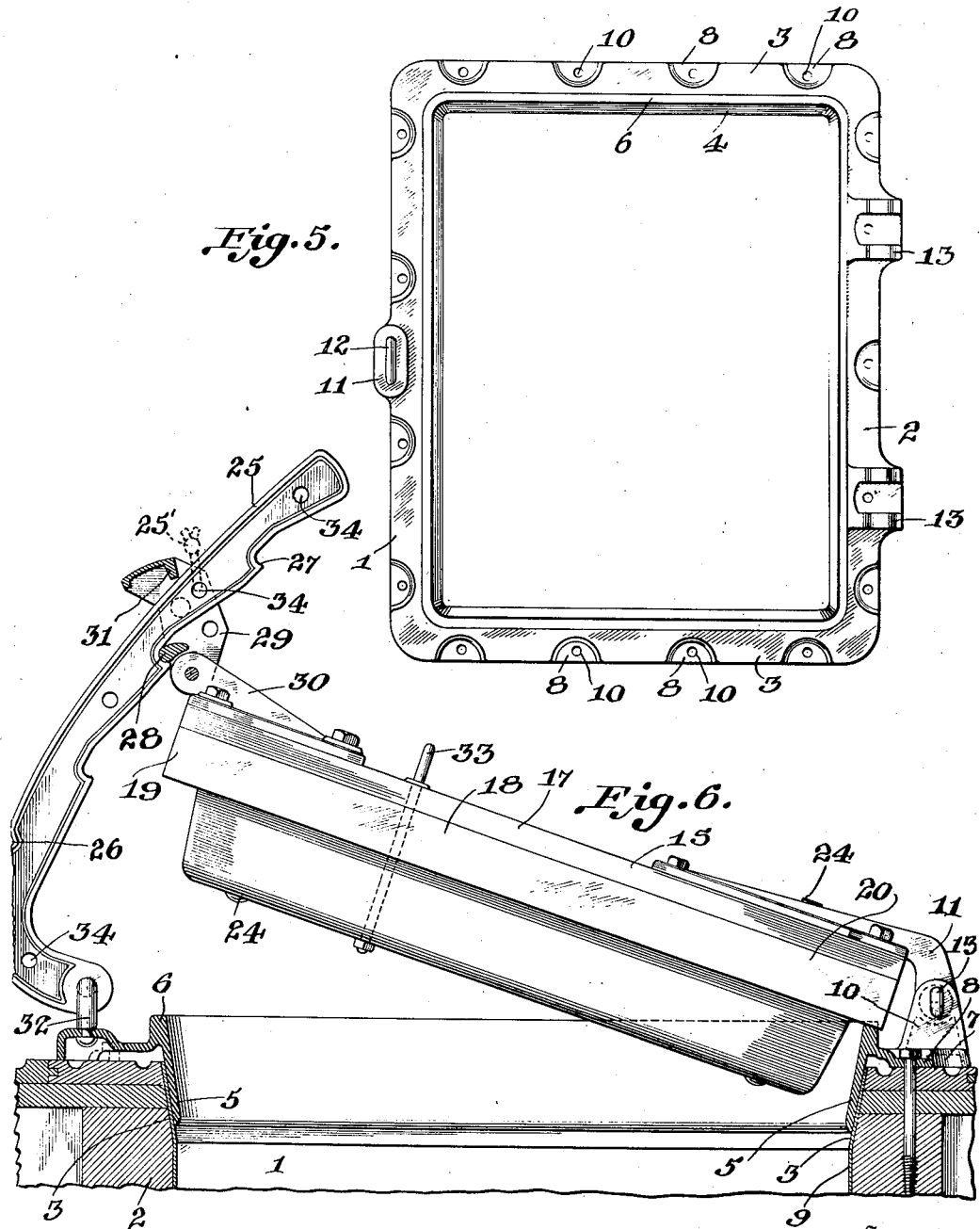

1,574,777

UNITED STATES PATENT OFFICE.

WILLIAM E. WINE, OF TOLEDO, OHIO.

HATCH COVER AND MEANS FOR OPERATING AND LOCKING THE SAME.

Application filed March 31, 1924. Serial No. 703,168.

*To all whom it may concern:*

Be it known that I, WILLIAM E. WINE, a citizen of the United States of America, residing at Toledo, in the county of Lucas and State of Ohio, have invented certain new and useful Improvements in Hatch Covers and Means for Operating and Locking the Same, of which the following is a specification.

My invention relates to new and useful improvements in hatch covers and means for operating and locking the same, and is of the same general type as shown in the U. S. Letters Patent No. 1,473,655 granted to E. A. Sweeley, November 13, 1923, for hatch covers and means for supporting and locking the same.

The present application has to do with an improvement over the invention above mentioned, in that additional means are provided for loosening and starting the door in its upward movement when the operating and locking arm is moved.

Generally speaking, the invention comprises a hatch cover and a supporting device therefor wherein a link is secured to a hatch frame through which, in turn, passes the supporting arm, which arm is to be moved to support the hatch cover in any one of a number of positions after the link on the hatch frame has been thrown. Also, to so construct the main supporting arm and link, that the link may be thrown to engage the supporting arm and after a slight initial movement of the arm a leverage is provided for starting the door or hatch cover in its upward movement. Furthermore, to provide a hatch cover and a frame the latter encircling the hatch-way so that a plug may be securely attached to the hatch cover rather than being placed below the hatch cover, as is the usual practice, so that the initial movement of the door will also release the plug, and a continual movement of the door, of course, carrying the plug with it.

The frame shown in the present application forms the subject matter of a separate application filed of even date herewith and bearing Serial Number 703,169.

The invention further consists in so arranging the hinge on the hatch cover, that the hatch cover and plug may shift slightly longitudinally, thus allowing the plug to more easily release and adjust itself as it is forced inwardly into the frame when the hatch is closed.

Still another object of the invention is to provide a hatch cover and operating and locking means which may be easily installed, relatively cheap to manufacture, and at the same time capable of being operated with less energy than heretofore necessary with the hatch covers now in general use.

With these and other objects in view, the invention consists in certain new and novel constructions and combination of parts as will be hereinafter more fully described and pointed out in the claims.

Referring now to the drawings showing a preferred embodiment of my invention,

Fig. 1 is a longitudinal sectional view of my improved hatch cover, showing the main supporting arm in its locked position.

Fig. 2 is a similar view but with the arm slightly raised and the parts set for starting the initial opening of the door.

Fig. 3 is a view showing the supporting arm moved to a point where it has started the hatch cover to an open position.

Fig. 4 is a detailed view of the hinge bracket and hinge.

Fig. 5 is a plan view of the frame, and

Fig. 6 is a view showing the hatch cover in a supported partly open position.

Referring now more particularly to the drawings, there is shown a hatchway 1, and the carlines 2, the upper edges of these carlines and roof being beveled as at 3, so that the metal frame 4 may fit snugly therein. In the present form of hatchway, it is not necessary to have the usual hatch lining projecting slightly above the car roof as the metal frame 4 is so formed as to not only fit partly within the hatchway, but to extend above the level of the car roof, thus forming a seat for the hatch cover, as may readily be seen in the several views.

Referring, generally, however, to the frame, it consists of sloping upright walls 5, which are thickened as at 6 from which merges a rim 7, designed to be secured to the surface of the car roof about the hatchway, as at 8, lag screws 9 being passed through openings in the rim to hold the frame in its position. Brackets 10 are also formed integrally with the frame as may be seen in the several figures, and a hinge arm 11 is provided with an elongated opening 12, so that the pintle or cotter 13 when passed through the opening 14 in the bracket, and the opening 12 in the hinge arm, will allow a slight longitudinal movement of the hinge arm. The hatch cover 15, per se, is similar to the cover shown in the patent to E. A. Sweeley, No. 1,485,312, issued February 26, 1924; consisting of the wooden portions 17 and 18 and the metal frame 19 inserted between these portions as clearly described in the above mentioned patent. This frame 19 extends below the under surface of the lower wooden portion 18 and encircles the upper portions of the frame 6, a slight clearance being shown so that the door will readily seat in place, and be allowed to shift slightly, longitudinally, as formerly mentioned, due to the elongated opening 12 in the hinge arm 11.

Referring now to the plug 20, it is made up of a plurality of wooden sections and arranged to provide air spaces 21. It may be lined around its outer edges with felt 22, or other material having good insulating properties, over which may be secured a metal covering 23 so that when the plug is wedged within the walls 5, a close fit will be provided to retain the cold air in the refrigerator car. A number of bolts 24 are provided so that the plug will be tightly secured to the under surface of the hatch cover and carried thereby.

There are a number of advantages of a construction of this nature, as it not only cheapens the cost of the hatchway, but it facilitates the handling of the ice, inasmuch as when the hatch cover is opened, the plug is also removed, thus saving reaching down into the hatch way to pry, and pull out the plug, as is the usual practice.

Referring now to the operating and locking means for the hatch cover, the main supporting arm 25 has a notch 26 provided on the outer surface of the arm near its lower end, the function of which will be shortly referred to. On its undersurface, the arm is provided with the projections 27 which are engaged by the web 28 formed in the link 29, which link is fastened to the arms 30, which are in turn, secured to the hatch cover. This link has a downwardly projecting flange 31 formed across an inner surface of the same, and is adapted to engage the notch 26 heretofore referred to when the link is swung upwardly as shown in Figs. 2 and 3. The arm 25 is secured by the hasp 32, so that this arm 25 may be raised and the web 28 caused to engage one of the projections 27, and the link and arm thus support the door in one of a number of desired positions.

Furthermore, in the present invention, when it is desired to open the door, the link 29 will be thrown so that the flange 31 engages the notch 26 and the arm 25 then raised to a position as shown in Fig. 3 before the hatch cover is started. A movement now from the position shown in Fig. 2 to the position of the arm shown in Fig. 3 through the cooperation of the link, loosens the hatch way, and loosens, of course, the plug within the walls 5, after which the handle 33 may be grasped by the operator and the door raised manually, allowing the link to slip along the arm. The hatch cover may then be entirely opened or, the web 28 may be made to engage one of the projections 27 and the hatch cover supported in a partly opened position.

In other words, in the present instance, the arm and link are used not only to support the hatch cover in a partly opened position or hold them in a locked position, but the arm is also used as a lever for an initially starting of the hatch cover and plug from its shut position.

It might be here mentioned that the lug 31 does not interfere with the locking of the arm 25 when the arm is in its downward position, as shown in Fig. 1, this locking action being exactly the same as in the Sweeley Patent, No. 1,473,655, already referred to. By providing the elongated opening 12 in the hinge arm, a slight longitudinal movement is possible when the hatch cover and plug are pried loose. Holes 34 are provided in the arm 25 and in the link 29 so that a seal 25' may be passed therethrough in the usual manner.

From the foregoing, it will be seen that I have provided a hatch cover, a frame, a plug, and a locking and supporting arm, and the latter so arranged that the hatch cover and plug may be quickly and easily pried loose with but relatively little effort. The hatch cover may then be supported in a number of desired positions. Furthermore, the plug will fit tightly within the frame and thus retain the cold air within the refrigerator, and although I have described the invention as applied to refrigerator cars, it is applicable to a number of forms of hatch ways, or other openings of a similar nature.

Many slight changes might be made without departing from the spirit and scope of my invention.

Having thus described my invention, what I claim as new and desire to secure by Letters Patent is:—

1. In combination with a hatch frame, a hatch cover pivotally mounted on said frame, a supporting link pivoted to one of said members and a supporting arm pivotally secured to the other of said members, and said link frictionally engaging said arm when in one position tightly locking the hatch cover on said hatch frame, and allowing the hatch cover to be supported in a partly open position when said link and said arm are operated, and cooperating means on the said supporting link and the said supporting arm so that a movement of the said supporting arm will release the hatch cover from its seat, and a lug formed on the supporting link, the said supporting arm also provided with a notch for cooperating with the lug so that a movement of the arm will partly lift the hatch cover from its seat.

2. In combination with a hatch frame, a hatch cover pivotally mounted on said frame, a supporting link pivoted to one of said members and a supporting arm pivoted to the other of said members, the said arm provided with means on its upper and under portions for cooperating with the said link so that a movement of the arm will partly raise said cover when said arm is operated and to support the hatch cover in a partly open position thereafter.

3. In combination with a hatch frame, a hatch cover pivotally mounted on said frame, a supporting link pivoted to one of said members and a supporting arm pivoted to the other of said members, the said arm provided with a plurality of notches on its under surface and a notch on its upper surface, a link provided with a web near its inner end for engagement with the notches on the under surfaces of the arm to support the hatch cover in a desired position, and the link further provided with a projection to engage the notch on the upper surface of said arm, so that the movement of the arm when the link is thrown will start the hatch cover to an open position and the hatch cover capable of a slight shifting movement.

4. In combination with a hatch frame, a hatch cover pivotally mounted on said frame and allowed to move slightly longitudinally, a supporting arm pivotally mounted on said frame and a cooperating link pivotally mounted on said hatch cover, projections formed on the inner surfaces of said link, the said arm provided with a notch on its outer surface and a plurality of cut out portions on its under surface, one of the projections in the link engaging the notch in the upper surface of the arm when the link is thrown to thereby start the door when the arm is operated, after which the other projection on the link will engage one of the cut out portions in the lower portion of the arm to thereby support the door in a partly open position.

5. In combination with a hatch frame, a hatch cover pivotally mounted on said frame and capable of a slight shifting movement, a pivotal link secured to the hatch cover and a pivotal arm secured to the hatch frame, the link and the arm so arranged that a movement of the arm when the link is thrown will slightly raise and shift the hatch cover after which it may be manually raised and the link and arm cooperate to then support the hatch cover in an open position.

In testimony whereof I affix my signature.

WILLIAM E. WINE.